United States Patent [19]
Winslow

[11] Patent Number: 5,852,825
[45] Date of Patent: Dec. 22, 1998

[54] FORM DATA MESSAGE FORMATTING METHOD, PROGRAM AND SYSTEM

[75] Inventor: Phillip D. Winslow, Hayward, Calif.

[73] Assignee: Trimble Navigation Limited, Sunnyvale, Calif.

[21] Appl. No.: 909,464

[22] Filed: Aug. 11, 1997

Related U.S. Application Data

[63] Continuation of Ser. No. 349,409, Dec. 5, 1994, abandoned.

[51] Int. Cl.[6] .................................................... G06F 17/30
[52] U.S. Cl. ............................... 707/6; 707/10; 707/100; 455/410
[58] Field of Search ................................ 707/10, 100, 6; 455/410

[56] References Cited

U.S. PATENT DOCUMENTS

| | | | |
|---|---|---|---|
| 4,695,977 | 9/1987 | Hansen et al. | 379/93.14 |
| 4,746,994 | 5/1988 | Ettlinger | 360/13 |
| 4,747,127 | 5/1988 | Hansen et al. | 379/93.14 |
| 4,866,610 | 9/1989 | Reiners | 395/702 |
| 4,887,204 | 12/1989 | Johnson et al. | 707/10 |
| 4,899,136 | 2/1990 | Beard et al. | 345/156 |
| 4,901,221 | 2/1990 | Kodosky et al. | 345/348 |
| 4,914,568 | 4/1990 | Kodosky et al. | 345/349 |
| 4,939,507 | 7/1990 | Beard et al. | 345/156 |
| 4,942,540 | 7/1990 | Black et al. | 395/200.58 |
| 4,984,152 | 1/1991 | Muller | 345/333 |
| 5,007,050 | 4/1991 | Kasparian et al. | 370/280 |
| 5,040,131 | 8/1991 | Torres | 345/352 |
| 5,041,982 | 8/1991 | Rathnam | 701/200 |
| 5,051,898 | 9/1991 | Wright et al. | 707/4 |
| 5,063,523 | 11/1991 | Vrenjuk | 395/200.53 |
| 5,065,347 | 11/1991 | Pajak et al. | 345/348 |
| 5,079,723 | 1/1992 | Herceg et al. | 345/352 |
| 5,101,425 | 3/1992 | Darland et al. | 379/34 |

(List continued on next page.)

OTHER PUBLICATIONS

Kevin Phillips, "The Inmarsat Standard–C Communications System", IEEE, pp. 1117–1123, Dec. 1988.

*Primary Examiner*—Thomas G. Black
*Assistant Examiner*—C. Lewis
*Attorney, Agent, or Firm*—Blakely, Sokoloff, Taylor & Zafman

[57] ABSTRACT

A data message formatting program, method and system uses a script-driven, Output Description Language (ODL) program module. The ODL module interprets and executes instructions from an ASCII .ODL script file. The .ODL instructions and the ODL programming language cooperate with the output of a conventional data entry and display program module. The close coupling of the data structures of the data entry module and the ODL module provide a powerful means for automatically re-formatting data entered prior to transmission over a communication network. The .ODL file may be generated by a system administrator or user with a conventional text editor by following an Output Description Language Programming manual. The .ODL file and ODL module are designed to be used in combination with a Form Interpretive module (FIM) and corresponding form data file which are also installed on the system. The corresponding form data file is constructed with a corresponding Form Builder software Tool (FBT) which may be operated off line. The FIM is used to display and edit a set of form data elements which are to be entered and/or altered by a user of the system, prior to re-formatting and transmission of a data message incorporating the edited form data to a remote receiving site over a communication network. One embodiment of the ODL language is described. The ODL embodiment is designed to work compatibly with an FBT and FIM to permit a multiplicity of compatible pairs of .ODL and form data files to used to enter, modify and customize the format of data messages to be transmitted to the remote site. The FBT and FIM may be derived from commercially available software packages.

5 Claims, 11 Drawing Sheets

Microfiche Appendix Included
(1 Microfiche, 36 Pages)

U.S. PATENT DOCUMENTS

| | | | |
|---|---|---|---|
| 5,113,517 | 5/1992 | Beard et al. | 395/500 |
| 5,121,113 | 6/1992 | Kedge et al. | 345/168 |
| 5,140,419 | 8/1992 | Galumbeck et al. | 348/465 |
| 5,144,548 | 9/1992 | Salandro | 364/138 |
| 5,146,562 | 9/1992 | Kukla | 345/331 |
| 5,159,687 | 10/1992 | Richburg | 395/702 |
| 5,179,652 | 1/1993 | Rozmanith et al. | 345/331 |
| 5,179,657 | 1/1993 | Dykstal et al. | 345/335 |
| 5,185,857 | 2/1993 | Rozmanith et al. | 707/507 |
| 5,202,828 | 4/1993 | Vertelney et al. | 707/530 |
| 5,202,963 | 4/1993 | Zelley | 395/883 |
| 5,212,770 | 5/1993 | Smith et al. | 345/335 |
| 5,222,211 | 6/1993 | Mueller et al. | 707/506 |
| 5,228,123 | 7/1993 | Heckel | 345/334 |
| 5,231,510 | 7/1993 | Worthington | 358/460 |
| 5,243,519 | 9/1993 | Andrews et al. | 704/8 |
| 5,251,130 | 10/1993 | Andrews et al. | 704/3 |
| 5,343,512 | 8/1994 | Wang et al. | 379/59 |
| 5,557,798 | 9/1996 | Skeen et al. | 395/650 |

FIG. 2

| LOGGED IN 244 POR | MCS: 244 | NO MESSAGE | IDLE |

SCALLOP FISHING REPORT - ver 0.2

TRIP STATUS: in Progress   TARGET SPECIES: Scallops
62A ⁓ 64A                  62B ⁓ 64B ――― Weather Observations ―――

62C ⁓ Date: [mo/da/yr]   64C
       Time: hr:mm

62D ⁓ WIND DIRECTION (deg):270    62F ⁓ BAROMETRIC PRESSURE :31  ⁓64F
                          64D                                    ⁓64G
62E ⁓ WIND SPEED (knots) :12      62G ⁓ AIR TEMPERATURE (F):55.0
                          64E                                    ⁓64H
                                  62H ⁓ SEA SURFACE TEMP (F):43.0

――― Instructions: ―――

Step 1) Press EDIT to modify form
Step 2) Move hi-light bar to each field using △▷▽◁ keys
Step 3) Fill out information in each field
Step 4) After completion, press ESC and SEND

FIG. 4

LOGGED IN 244 POR | MCS: 244 | NO MESSAGE | IDLE

SCALLOP FISHING REPORT  ver 0.2

TRIP STATUS:  in Progress      TARGET SPECIES:  Scallops
    62a         64a                  62b         64b — Weather Observations —

182 — Date:
184 — Time:      DATE | TIME  — 186

WIND DIRECTION (deg):270          BAROMETRIC PRESSURE  :31

WIND SPEED  (knots)  :12          AIR TEMPERATURE   (F):55.0

SEA SURFACE TEMP  (F):43.0

— Instructions: —

Step 1)  Press EDIT to modify form
Step 2)  Move hi-light bar to each field using △▷▽◁ keys
Step 3)  Fill out information in each field
Step 4)  After completion, press ESC and SEND

FIG. 7

·······  Logged Out    Not Tuned    No Message    NO DCE LINK

SCALLOP FISHING REPORT - ver 0.2

TRIP STATUS: [Start] ~202    TARGET SPECIES: Scallops ~212

———— Weather Observations ————

Date: 7/26/94 ~204
Time: 10:00 ~206    BAROMETRIC PRESSURE :3000 ~214

WIND DIRECTION (deg): 10 ~208    AIR TEMPERATURE (F): 62.0 ~216

WIND SPEED (knots) :12 ~210    SEA SURFACE TEMP (F): 48.0 ~218

———— Instructions: ————
Step 1) Press EDIT to modify form
Step 2) Move hi-light bar to each field using △▷▽◁ keys
Step 3) Fill out information in each field
Step 4) After completion, press ESC and SEND

[Edit]
Send
Next
Clear
PRint
Quit

```
LINE
NO.

1      $ODL {                                         |_
2          MESSAGE {
3                  /* turns debug mode on if uncommented   */
4                  DEBUG ON;
5                  #reference = "SOSEI";
6                     /* secret header     */
7                  output ("#&*\n") ;
8                  #formstrg= $FIELD [5] ;
9                  if (   #formstrg [0] == #reference [0] )   {
10                     output ("S") ;
11             }
12                 if (   #formstrg [0] == #reference [1] )   {
13                     output ("O") ;
14             }
15                 #formstrg= $FIELD [0] ;
16                 If (#formstrg [0] == #reference [2] )   {
17                     output ("S") ;
18                 }
19             if  (#formstrg [0] == #reference [3] )   {
20                     output ("E") ;
21                 }
22                 if (#formstrg [0] == #reference [4] )   {
23                     output ("P") ;
24                 }
25                 output ("%s%s" , $FIELD [1] , $FIELD [2] ) ;
26                 output ("%03d" , $FIELD [3] ) ;
27                 output ("%03d" , $FIELD [4] ) ;
28                 output ("%04d" , $FIELD [6] ) ;
29                 output ("%+04d" , $FIELD [7] ) ;
30                 output ("%+04d\n" , $FIELD [8] ) ;
31                    /* initiate transmission of message   */
32                 MSG XMIT;
33         }
34     }
```

FIG. 9

```
          260
LINE
NO.
1          #&*
2          SS07269410000100123000+620+480
character  12345678911111111112222222223
no.                 01234567890123456789 0
```

FORM DATA MESSAGE FORMATTING METHOD, PROGRAM AND SYSTEM

This is a continuation of application Ser. No. 08/349,409, filed Dec. 5, 1994, now abandoned.

Microfiche Appendix

A microfiche appendix, containing 1 microfiche and 36 frames is filed herewith.

Output Description Language (ODL) And Programming Reference Manual is included as a Microfiche Appendix.

BACKGROUND OF THE INVENTION

1. Field of the Invention

The invention relates in general to a method and system for operating on, and controlling the format of message data elements retrieved from a display device, such as a video display screen, prior to transmission through a communication means. The transmitted message data elements are derived from a) display data elements presented on a display form and b) other data elements retrieved from sensors connected to a processing system. The transmitted message data elements are modified by means of interpretive program modules of a compiled application control program which interprets one or more uncompiled script files. More particularly the invention relates to a method, program and system for formatting Form data elements, which are entered on a video display screen Form, into formatted message data elements to be transmitted through a communications network to one or more of a number of different receiving locations, each location having a distinctive format requirement for the transmitted message data elements. The method, program and system provides for easy modification of the display form and message formatting by means of interpreted script files and closely coupled interpretive program modules.

2. Previous Art

Structured entry screens for specific business applications are commonly referred to as Forms. Forms generally consist of labels positioned adjacent to related data fields which merely need to be filled in by an operator. The data values entered into the Form data fields may then be passed to an application such as a word processor, spreadsheet, or the like. Forms may also include elements such as "icons", or elements on the display screen which may be selected by the operator to direct the behavior of the display or the software program, for example, by retrieving a previous Form or selecting a new Form. Selection of Forms or other operations may also be directed by "soft keys", eg. keys on the keyboard having specific meaning programmed into the resident software package which, when pressed, cause retrieval of a specific Form or execution of a specific action.

The Forms may be updated and changed as desired. A system administrator may create a Form or Forms for the operator that meets current business needs. Forms may be created using Form Creation or Form Building tools that can be operated by a computer literate individual or programmer.

Mobile Earth Stations (MES) are widely used for gathering data in remote locations and transmitting the data to central receiving locations. There are two primary functions to be performed by an MES; the first is data capture, i.e., the entry of form data elements on a Form by an MES operator; the second is message transmission, ie, setting up a message containing the message data elements and transmitting it to a receiving site or location. MES's typically are composed of Data Terminal Equipment (DTE) and Data Communication Equipment (DCE) modules. The DTE includes a computing processor unit, (CPU), a video display device (VDT), a keyboard for a user to enter information, system memory, including a hard drive or other means for storing information. The DCE includes a communication device such as radio or telephone for communicating with the receiving locations, a message transmission protocol processor, and may include other system parameter sensors such as a location determining device, ie, a GPS receiver, or the like.

The software or firmware for the CPU typically includes an operating system, a VDT form generator program for generating form displays and inputting user data into system memory, and a communication program for transmitting files and messages between the CPU and the DCE module. Many versions of form generator program modules and communication program modules are commercially available. Users may select specific programs and set up the system parameters to meet their needs.

Operating systems, form generator, and communication programs are almost always compiled or object code modules designed to provide functions that are defined by the code which comprises them. That is, the functions and behavior of the programs are fixed by the object code which is created by a compiling process. The compiling process is typically done in a laboratory or factory setting by the program manufacturer. Control statements in the MES programs, such as IF . . . THEN . . . ELSE . . . , WHILE . . . DO . . . , typically provide the necessary function and behavior built into the program at the time of development by the manufacturer or programmer. Providing new functions or new behavior would require writing new source code, compiling the source code and releasing and installing a new version of object code on the MES CPU.

Each MES program or module is a well defined piece of executable code that has clear functional boundaries and defined data structures. The individual modules may be designed to use data structures common to one or more of the other modules. In this case, the developer of the modules which must cooperate, must have access to the source code for each module so that data transfers between compiled modules are controlled.

For commercial fleet operations, someone, such as a system administrator, will typically have the responsibility to select software packages and support the implementation on the fleet hardware platforms. System administrators may also write custom applications to interface between the commercial software programs to meet specific system requirements. For example, a fleet system may have a data processing system at a central location which receives messages from the fleet MES platforms, including data entered by the MES operators, and stores the information in one or more data bases for later processing.

Often, the central data processing system will have distinctive existing formats for message data which are adapted to the needs of the particular processing system and data bases. In such a case, the system administrator, or a designate such as a contract programmer, may write a custom message formatting program module to convert the data messages into a specific desired format for the subject data processing system. The custom formatting program module could reside in the MES and do the re-formatting before message transmission. Alternatively, the custom formatting program module could reside in the central processing system and do the formatting after message receipt. In either case, having a supporting a number of MES platforms with operators communicating with differing central locations having different message formats soon becomes a management task of forbidding magnitude. It would be an advantage to have a system and a method to simplify the problem of meeting the distinctive message format requirements of different receiving locations.

There are many cases in which MES equipment is used to communicate with remote receiving locations which have differing data message formats. For example, commercial fishing fleets will send messages to their own operations location and may also be required to send messages to a fisheries agency, other national agencies or to other fleets. Each of these receiving locations may have widely differing message formats as input to its own central computing system.

Operators of MES systems generally are in non-computer related occupations such as truck driving, shipboard operations and the like. People of these occupations are not expected to have, and generally do not have high levels of skill in using such equipment for composing and transmitting messages to remote sites. This is particularly true if the operator has several different receiving sites with which to communicate. For this reason, the current art has tried to simplify the process of message preparation and transmission for the operator. One approach which simplifies this problem is to provide structured data entry screens that are tailored to the operators business application.

Form Tools are generally separated into two distinct program modules. The first module, referred to as a Form Building Tool (FBT) is typically used by a programmer or system administrator in a laboratory environment to capture the design of the Form and store the Form design information in a Form design data structure or Form Display File. The FBT typically allows the programmer to specify attributes of labels and data fields such as font style, size, color, screen location, border style, field length, data type and the like. The Form Display File is then stored on operator's MES systems in the field as a file that is distinct and separate from the other CPU firmware. Another module of the Form Tool may be a form display module or form interpretive module (FIM) that interprets the Form display file, displays the Form on the VDT, accepts operator data input and stores input data values in a display input data base. The FIM is installed on the operators MES system along with the Form Display File(s). In this way, different Forms can be added as files that may be accessed and interpreted by the compiled FIM of the operator's MES system CPU firmware without re-compiling or changing the operator's MES system CPU firmware.

The FBT and FIM typically will be compiled object code. The FBT will typically generate a display file in an intermediate language which describes the location and appearance of objects on the VDT when interpreted by the FIM module. See "Encyclopedia of Computer Science, Third Edition", A. Ralson and E Reilly, Van Nostrand and Rheinhold, New York, N.Y., for a discussion and comparison of compiled vs interpreted program languages. Briefly, a complied program is derived by translating each statement from a high level source language program, in its entirety, into one or more machine language statements in a binary format suitable for machine execution, whereas an interpretive program translates and executes each intermediate source language statement into machine language before translating and executing the next one. The intermediate language may either be a binary symbol set or a readable alpha-numeric symbol set.

The Form design data structure or display file may be a binary data file or a simple text file that is loaded on the MES system. The Form file(s) may alternatively be transmitted or downloaded by the systems administrator to the MES.

The Form may be used to capture values entered by the operator in the data fields provided. The values entered into the data fields may then be stored into a form value data base resident in the computer of the MES. One such Form Building Tool is the "C-Worthy" form building tool available from Novell of Provo, Utah. Others of the same type are well known in the art. Part of the C-Worthy program includes the FBT used by the system administrator to generated form display files and the FIM used by the operators in the field. The compiled form display interpretive program module (FIM) is resident in the MES firmware and interprets Form display files After the entry of the data into the Form, the operator is still faced with the problem of message transmission. The form value data base may be a simple text file which may be transmitted by the operator by using the CPU and DCE equipment provided by the MES. File transmitting programs, such as the share ware programs PROCOMM or KERMIT, for transmitting binary or text files from CPUs over the phone lines are well known in the art. Commercial programs, such as Microsoft Terminal from Microsoft Corporation, Seattle, Wash., are also available. File transmitting programs for transmitting files over radio links are also known.

File transmitting programs provide the ability for an operator to set up a transmission of a prepared message file by typing commands or by using a mouse and icons on the screen of a PC. However, the message transmitted will only be whatever the operator has prepared by manual data entry or by entering data on a Form. These programs are intended to automate dialing procedures and modem control. They do not provide pre-defined Form entry or message data filtering or processing. Any special data desired by the recipient, such as current location of the MES, direction, speed and the like, would have to be communicated by the recipient to the operator. Also, any special formatting requirements for the data to be transmitted would have to be communicated to the Operator. The operator would then have to look up, or otherwise access the desired data by some means, translate and enter the data in the desired format into the Form or into a text editor in free form mode.

Special data requirements for particular receiving locations, therefore, are an additional burden on the MES operators, or would require the system administrator to rewrite the code for each application or associated MES software module. Space limitations in the visual field of the From may limit the number or types of data that could be entered on one Form. On the other hand, free form data entry using a text editor would eliminate the benefits of a pre-defined Form. These benefits include features such as structure or guided entry, automatic data stamping (such as position) and or data entry field limiting (such as number of characters, special character masking or general visual layout).

In previous MES units used to communicate with a number of different receiving locations, custom control programs had to be written to adapt the format of the form data elements as presented on the display screen or stored in a message file, to the message data format desired by a specific receiving location. These prior message control programs were compiled modules with fixed functionality, that is, only the message format specific to compiled custom control program could be transmitted. A new custom control program would be needed for a different message format. A more specific example is discussed below.

In the previous art, the interface between the message composition and message transmission is under the control of the operator. The operator may have to be trained in an additional skill to use multiple programs and/or windows for message transmission. The operator may also have to read messages from the targeted recipient or additional documentation to know what data or format the recipient desired.

In many cases, the data messages are not transmitted directly to a dispatch operator. They are sent to a computer for parsing into appropriate data fields and then used to update the status information of a host computer. For example, in the Package Delivery Business, a driver may send a Package Delivery Form to a central processing location. This Form could contain the following information:

Form Header indicating that this is a Package Delivery Form.
Current Position in latitude and longitude
Waybill number
Delivery Time
Current loading status of Truck
A free form message to the Dispatcher The host computer at the central location may process and separate the data, and then update various data bases within the host business management package. For example:

Form header: Used by the host program to cross reference the Form format. In other words, the data that follows will adhere to the "Package Delivery Form", not to a different form with a different format.

Current Position: This information might be extracted and sent to a map data base on the host computer, so that an Icon can be positioned on an electronic map for the operator to see.

Waybill Number/Delivery Time: This information might be used to update the billing program. Since the package has been delivered, a billing invoice can be sent to the customer.

Current Loading Status: This might be sent to the mobile status data base. The next time the dispatch operator searches for an available truck, the position, loading status and other data would be considered in the selection of a potential delivery truck.

The point of this example is that the data sent to the central dispatch computer must be in a rigid format that can be extracted, separated and analyzed by a computer. Furthermore, each fleet owner or customer may use a different business management package that has unique requirements in terms of this rigid data format. Classically this problem was solved by writing compiled executable software which resided in the communicating hardware, that transmitted data in a format that matched exactly the specific requirements of the central host computer software at the receiving location. Dedicated executable software must either be re-compiled by the system administrator for each field system configuration and distributed to each system in the field, or distributed in source code version, loaded on each MES and then re-compiled in the field system. This presents a severe limitation in the flexibility needed to mass produce an MES software package. Each installation or fleet must be customized, resulting in significant engineering, added cost and schedule time for each new fleet.

In the case where there are a number of different targeted recipients for a given message, there may be multiple data format requirements for the same message. This is the case for the administration of a fishing fleet. Data messages may be required by the fleet system administrator. Data messages may also be required by a governing agency, such as a Federal agency and possibly an international agency. The format of the message for the system administrator will in general be different for that of the agency or agencies, even if the data values are the same. In the previous art, MES's having such multiple format message requirements may need entry of additional messages to different recipients using the same data.

In order to transmit a message with a desired format to a specific host, some means was needed to associate the message entry Form with a specific format control program and the intended recipients address or phone number.

Existing receiving systems often have pre-existing established formats for receiving data messages. For example, a message may be represented as a concatenation of fields, representing a label such as 'NAME', followed by a delimiter such as "(space) or" (semicolon), or "\r\n" (carriage-return/line-feed) followed by a data value or ASCII string, such as 'SMITH', or '123'. The sequence of labels, delimiters, values and the field lengths are generally specific to the receiving location and generally are adapted to be input into a computer system as input to a spread sheet application, another message display device, a word processor or the like.

Typically, the transmitting system has a formatting program, that resides in a computing device attached to the transmitting system, which is a custom program specifically written to adapt the originating screen display data format to the desired receiving system format.

As each receiving system generally is unique, any MES transmitting system desirous of interfacing with a large number of different receiving systems, must necessarily have a large number of custom programs written and supported. As receiving systems evolve or as members are added to the group of those to be transmitted to, the MES system must have the custom formatting program or programs updated, recompiled, and distributed to the desired MES units.

Updating, compiling, distributing and maintaining version control on a dynamic group of custom formatting programs for use on geographically disperse MES units is a significantly costly and time consuming enterprise. Data formatting control programs of this type frequently consume several, if not many, megabytes of storage. When the remote MES download is performed, the volume of traffic for updating such control programs and the storage capacity required can add appreciable cost to each MES in the field, in addition to the system management burden on an MES system administrator.

It would be an advantage to simplify the process of adding to or changing the formatting of the data transmitted by the MES and to retain the flexibility to adapt to many receiving formats.

It would also be an advantage to have a form generating and message formatting transmission system which were closely coupled.

One example of a communication network for transmitting messages from a plurality of MES's is the Inmarsat-C satellite communication system, which is described in related patent application 08/248524, pending, herein incorporated by reference. A description of system requirements for Mobile earth stations in the Inmarsat-C system is described in *System Definition Manual* (SDM), Inmarsat, Volume 3, Module 4, Release 2.0, April 1992 herein incorporated by reference.

The present invention is directed toward satisfying the needs described above.

SUMMARY OF THE INVENTION

It is an object of the invention to provide a Mobile earth station satellite communications system with script controlled message formatting means.

It is an advantage of this invention to provide a message formatting script language and program that allows message formats that can be altered in the field or on an application basis without the need to re-compile the source code for the MES firmware.

It is also an object of this invention to provide a software program for formatting data messages in a wide variety of custom formats by using a script interpreting control program.

It is another advantage of this invention to provide a programming language for easily converting the data message output from a Form Interpreting program (resident in the MES) into a customized data message format for transmission by a serial communication system.

It is an object of this invention to provide a process for converting form display data in a first format into message data having a second format for transmission through a communication means.

In accordance with the above objects and those that will be mentioned and will become apparent below, the Script Driven Message Processing Method, Program and System of the present invention comprises: a mobile data display and communications terminal (MES), the MES comprising:

an output for connecting to a display device for displaying Form data;

connection means for connecting to a transceiver module for communicating data messages through a communications network to at least one remote receiving station;

user input device connection means for connecting to a user input device;

a general purpose computing device (CPU), the CPU having system memory for storing programs and data, and working memory for storing intermediate results of computations, the CPU having display driver means for driving the display device;

a plurality of control files stored in system memory;

first program means capable of interpreting at least one of the control files to provide display driver instructions to the display driver means, the driver instructions providing Form Label Fields and Form Data Fields on the display device, the at least one of the control files and the first program means providing means for transferring input data values entered into the Form Data Fields on the user input device and storing said data values in first system memory storage locations;

second program means capable of interpreting an at least second one of the control files to provide for accessing said input data values from said first system memory storage locations, the second program means and the at least second one of the control files providing format and control operation means for formatting said input data values into a predetermined message data output format;

message transmission means for transmitting the message data output to the transceiver module, whereby the input data values will be formatted into a predetermined message data output format and transmitted by the transceiver module to the remote receiving location.

The present invention allows automatic reformatting of the display data which is entered into a remote data terminal equipment, such as an MES, to be modified to one of a multiplicity of message formats without having to write, compile and release new message formatting application programs to be installed on the MES.

The MES firmware includes a data entry program module (FIM) and a message formatting program module (ODL). The FIM and ODL modules are compiled object code programs coupled by means of common memory locations for storing and accessing data values which are presented on the MES display.

The FIM module controls the appearance and behavior of the data entry process, ie, what data is displayed to the user in the form of labels and fields, and where the data values which are entered by the user, are stored in system memory. The FIM module operates by interpreting the instructions of a form data file (.FRM). The .FRM file is a data file containing data structures on how to display and interact with a form. The data structures in the .FRM file have a different format than classic CPU instructions. The .FRM data structures are used by the FIM module to make decisions from a fixed selection of choices on how a form can be displayed or interacted with. The method of preparation of the .FRM file is discussed further below. The description of the constructs for the .FRM form data file, the preparation and loading of the .FRM file for the preferred "C-WORTHY" form module is described in the "C-WORTHY USERS GUIDE AND PROGRAMMERS MANUAL" herein incorporated by reference, published by Novell Corp, Provo, Utah and is not a subject of the present invention.

The output of the FIM module is directed in two directions. First, there are display signals directed to a display driver which controls the MES display, thereby presenting the MES operator with the desired display and the capability of entering data into the entry fields. Second, the form data elements representing the characteristics and values of label and data fields on the display are directed to storage locations in system memory, ie, a data base described below.

The .FRM file is generally created by a display form building program tool (FBT) in a separate process, off line, by a system administrator or programmer. The FBT and FIM modules are cooperating programming modules of a form building and display program. Different forms having different labels, fields and appearance can be prepared for the MES operator to use by selecting different .FRM files for the FIM module to interpret.

A corresponding output message formatting control file (.ODL) is similarly prepared by the system administrator or programmer. The .ODL file may be prepared by a conventional ASCII text editor by following the directions of the programming language used for the ODL module.

Each pair of corresponding .FRM and .ODL files are coupled by $FIELD[<index>] and $FLAB[<index>] ODL language keywords. The <index> number corresponds to the ordinal form field number on the form.

Form Field Keywords (FFK) are special keywords that are tied to system variables. A Form field which contains a FFK will be precharged with the value of the corresponding system variable. All form fields precharged by system variables via the FFK's look like regular form fields to the .ODL language.

The developer of an embodiment of the present invention must have access to and control of the source language code for both the FBT and FIM modules and the source language code for the ODL module. Although the FBT/FIM language and ODL language don't have to be the same, the languages must share a common set of form field variable names in order to pass the associated data and string values.

The functions of the FBT/FIM modules are addressed to the display and entry of labels and data values on the MES display. The actual appearance and location of labels and data displayed on the display device are controlled by the instructions contained in the .FRM file. A multiplicity of .FRM files may be prepared and stored in the MES system, which allows for a corresponding multiplicity of Forms to be displayed on the display device. This functionality provides a simple means for guiding a relatively unskilled operator in the process of data entry prior to sending a message to a remote location.

The functions of the ODL module are addressed to the formatting of the data values entered by the operator prior to the transmission of a message through the communications device of the MES. The ODL module also provides access to, and formatting of MES system variables which may be included in the transmitted message.

The actual description of the formatting of the data into a specific message format is controlled by the instructions contained in one of the .ODL files. The ODL module is an interpretive program that interprets and executes each successive instruction of the .ODL file sequentially The interpretive nature of the FIM and ODL modules provides the system administrator the freedom to generate and distribute a multiplicity of form and message format options for use by MES operators without having to re-write, re-compile and distribute the entire MES firmware package every time it is necessary to provide new functionality to the MES user community.

This avoids the cost and administrative burden of having to distribute multi-mega byte software packages and documentation to a geographically disperse user community. It allows for more stable MES firmware versions and minimizes the problem of tracking operating system firmware version numbers.

Instead, the administrator or system programmer only needs to provide a pair of relatively simple files, the .FRM file and .ODL file, which can easily be distributed over the same message link used by the MES for reporting, such as an Inmarsat link. Alternatively, files could be distributed by mailing floppies, by e-mail or other electronic file transfer means. It also allows the manufacturer of the MES equipment to more easily support a number of MES customers who do not have their own system administrators or programmers.

The design of the ODL module and output description language allows for including MES system variables into formatted messages as well. Alternate embodiments of the present invention may include location determining devices which are attached to the MES to input location information into the MES system variables which may be formatted and transmitted. These location determining devices may include Global Positioning Service (GPS) receivers, Loran receivers, fm phase discriminators and the like.

The communication device of the present invention may be a digital data radio, a digital packet radio, a cellular radio, an analog radio or the like.

In a Mobile Earth Station (MES) system for controlling form data entry and formatting message data elements for subsequent transmission, in which the system includes a display, a user data entry device, a general purpose computing unit (CPU) and a communication device connected to a communication network, the present invention includes a method for re-formatting form data elements displayed on the display, before transmission of the form data elements as re-formatted message data elements through the communication network. The re-formatted message data elements are formatted to be received by a remote receiving system connected to the communication network.

The method comprises the steps of successively interpreting data structures from a form data file (.FRM file) . The set of .FRM file data structures provide for controlling the display of a plurality of form data elements on the MES display. The display characteristics of font, size, color, and location of the display data elements include respective label and data entry display fields. The interpretation of the .FRM file continues until all the .FRM file data structures have been interpreted.

The selected form data elements in the respective label and data entry display fields, are displayed on the MES display device in the format defined by the .FRM file.

Memory images of the plurality of form data elements and corresponding display characteristics are stored in first respective system memory locations, ie a data base.

A second plurality of sequential output description language (.ODL) instructions from a corresponding .ODL script file, are successively interpreted and executed. The .ODL instructions define formatting operations on the corresponding memory images of form data elements stored in first respective system memory locations. The output of the .ODL format instructions result in a plurality of reformatted message data elements.

A formatted output message comprised of the reformatted message data elements is produced.

The formatted output message is connected to the communication device and the communication device is signaled for transmission of the formatted message.

The formatted message including the reformatted message data elements is thereby transmitted in the desired format to a remote receiving location by the communication device.

In a preferred embodiment of the invention, the formatted message is produced in the form or an intermediate file (.FDO file). The communication device is signaled to take the .FDO file and transmit the contents according to the protocol of the communication device and the communication channel to which it is connected. Another embodiment could directly connect the output of the formatting step to the communication device, whereby the intermediate .FDO file would not exist.

In a preferred embodiment of the invention, the output of the .FRM file data structures interpretation is stored as a complete data set of all display data and characteristics. An intermediate step of extraction is performed in which only the relevant data elements from the complete set are extracted and stored in an extracted data base for the .ODL instructions to access for further processing.

BRIEF DESCRIPTION OF THE DRAWINGS

For a further understanding of the objects and advantages of the present invention, reference should be had to the following detailed description, taken in conjunction with the accompanying drawings, in which like parts are given like reference numerals and wherein;

FIG. 2 is a diagram of a data entry screen of the Message Processing System of FIG. 1.

FIG. 4 is a diagram of a form having form fields containing the system variables "_Date" and "_Time".

FIG. 7 is a representation of a display screen resulting from the interpretation of a particular .FRM form data file.

FIG. 8 is a listing of the corresponding .ODL file for formatting the data from the screen of FIG. 7 into a message to be transmitted by the MES communication device.

FIG. 9 is a listing of the output formatted message file (.FDO file) resulting from the interpretation and execution of the instructions in the .FDO file of FIG. 8.

DETAILED DESCRIPTION OF AN EMBODIMENT OF THE INVENTION

The preferred embodiment of the present invention was targeted for a Mobile Script Driven Display and Message Formatting system (MES) application running on an IBM PC compatible or equivalent using the MS-DOS operating system, version 3.0 or later.

For more information on the IBM PC and the MS-DOS operating system, the following references are herein incorporated by reference. *MS-DOS Version 3.0 User's Guide*, Microsoft Corporation. For further information on the MES application, the following references are herein incorporated by reference. *Galaxy Inmarsat-C/GPS Land Mobile and Maritime Installation and Operating Manual*, Trimble Navigation, Ltd. *Galaxy 4.0 User Interface Software, Operating and Installation Manual Addendum*, 1994, Trimble Navigation, Ltd. DCE/DTE Interface Specification, Version 1.7, Dec. 6, 1992, Trimble Navigation, Ltd. *Galaxy Inmarsat-C/GPS, Recommendations for use of Position/Data Reports*, Version 1.2, Dec. 1, 1993, Trimble Navigation, Ltd.

The form data message formatting program, method and system of this invention is a vehicle with which a user may have messages automatically formatted from data presented on a display, before transmitting through a communication device.

Figure 1:
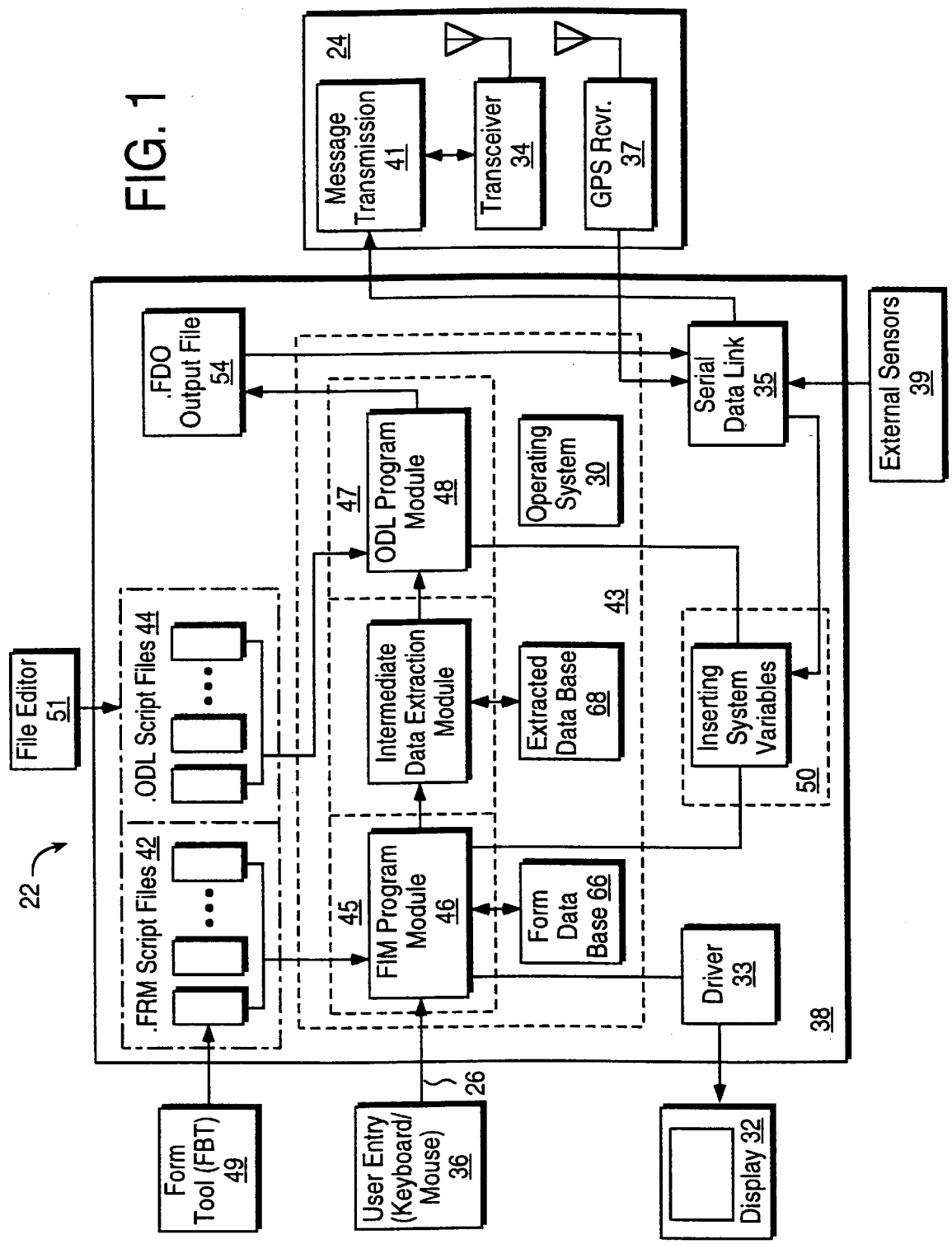
FIG. 1 is a block diagram of one embodiment of a script driven Message Processing System in accordance with this invention.

With reference to FIG. 1, there is shown a block diagram of an exemplary system in which the a preferred embodiment of the present message formatting invention may be described. An MES for preparing and transmitting messages over a satellite communication network is indicated generally by the numeral 20. The system 20 includes a Data Terminal Equipment device (DTE) generally indicated by the numeral 22 and a Data Communication Equipment (DCE) device 24. The DTE 22 includes a general purpose computing device 38 such as a PC 38 for operating the software of the invention, a Disk Operating System 30 such as MS DOS, a display device 32 such as a CRT monitor connected to the PC 38 for an operator to view user entered data (UED) and display other data derived from system variables (SV), a user data entry device 36 such as a keyboard or a mouse for the operator to enter and edit the UED, and a serial data link 35.

The DCE typically includes or is connected to a transceiver module 34, for communicating messages between the MES 20 and a remote receiving station (not shown). A transmission message protocol processor 41, and other devices such as a global position locating device, ie a Global Positioning System (GPS) receiver 37 may also be included as part of the DCE.

Figure 1A:
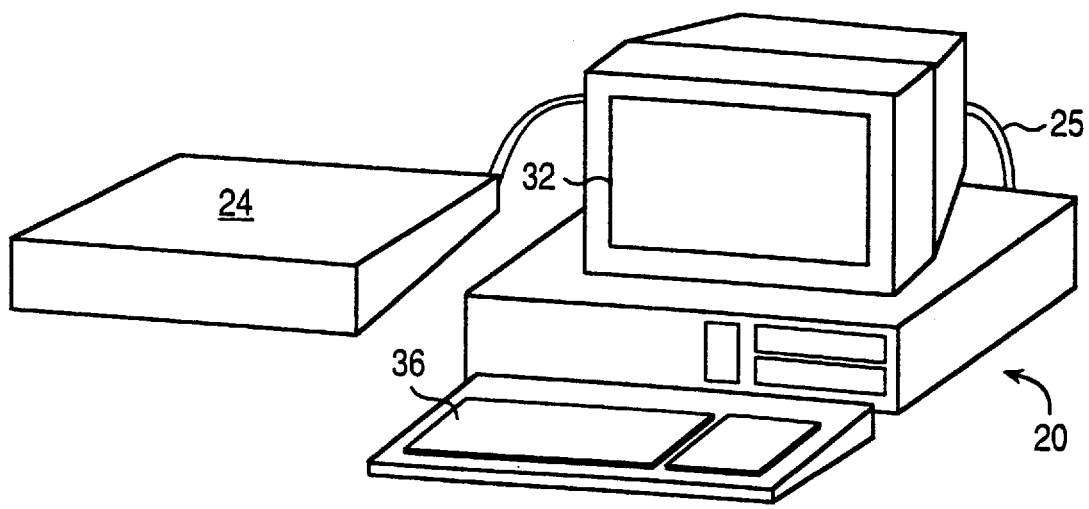
FIG. 1A is a an example of one configuration of the present invention.

FIG. 1A illustrates a physical implementation of the invention for the MES system 20 having a PC based DTE 22 connected to the DCE 24 by means of a cable connection 25. The physical configuration of the DTE 22 and DCE 24 may take on different aspects such as note book style PC's with built in display keyboard and hard drive, or as a conventional PC with separate monitor 32 and keyboard 36.

The PC includes system memory and disk storage allocated for storing files, programs, data and working storage. System memory may include run time RAM, ROM and peripheral devices such as hard disk, floppy, PCMCIA cards, external ROM, non-volatile RAM and the like. In the preferred embodiment of the invention, a portion of the disk storage is allocated to storage of Form Interpretive Module files (.FRM files) 42 and associated message Output Description Language files (.ODL files) 44.

Another portion of the system memory is allocated to a DTE Executable application program 43 running on the DOS operating system 30. The DTE Executable Program 43 comprises a Form Interpretive Module (FIM) 46, an Intermediate Data Extraction Module 47, and an Output Description Language module (ODL) 44. The FIM 46, IDE 47 and ODL 44 modules of this invention are described in more detail below. The .FRM files are interpreted by the Form Interpreter Program Module (FIM) 46. The .ODL 44 files are interpreted by the ODL program module 48.

The FIM 46 accepts input from the UED 36 and receives system variables 50 under control of the .FRM files 42. The FIM 46 outputs data to the screen driver 33 and a form data base 66 as will be described below.

In alternate embodiments of the present invention, the physical location of the various components may be apportioned differently and distributed in different consoles or housings than as shown in FIG. 1 and FIG. 1A, while maintaining the same cooperation of the functions.

For more information on the PC 38 and the DOS opening system, reference is made to the documentation well known in the art. For more information on the DTE application program 43 and the FIM module 46 of the present embodiment of the invention reference is made to the C-Worthy Interface Library Reference Guide and cwArchitect User Guide and Tutorial from Custom Design Systems Inc. Orem, Utah, the Galaxy Inmarsat-C/GPS Land Mobile and Maritime Installation and Operations Manual from Trimble Navigation, Ltd, Sunnyvale, Calif. herein incorporated by reference.

In the preferred implementation of the invention, an Intermediate Data Extraction module (IDE) 47 extracts selected form data elements from the data base 66 and outputs the extracted elements into an extracted data base 68.

The ODL module 48 of this invention interprets the input from a .ODL file 44 associated with the selected .FRM file 42, and operates on the extracted data base 68 and system variables 50 to produce a message in the form of .FDO output file 54. The .FDO file 54 includes reformatted message data elements from the extracted data base 68 along with other text and information that will be described in detail below. The ODL module contains powerful operations that can reformat and redirect the message without the intervention of the operator of the DTE 22. The .FDO file 54 is output through the serial link 35 to the message transmission module 41 of DCE 24. The formatted .FDO message file 54 is then transmitted through the transceiver 34 to the selected remote location.

External sensors 39, provide data such as wind speed, air and sea temperature, barometric pressure and the like, to serial data link 35 of the MES system 20. The DTE application program 43 stores the external data in the form of system variables 50, for use by the FIM module 46 and ODL module 48.

The script files 42 and 44 are generally stored on a hard disk (not shown), but may be stored on floppy disk, flash memory, NVRAM, ROM or other forms of storage media. A portion of system memory is allocated to the form interpreter FIM module 46 and the ODL module 48 of this invention. A portion of the system memory is allocated to receive the output of the ODL module 46 as a formatted output message file (.FDO) 54.

A suitable computer system 38 for operating one embodiment of the invention is a PC using a 80286 or higher microprocessor, a DOS operating system 30, version 5.0 or higher, 640 K bytes of conventional memory, with 512 K free, plus 512 K extended or expanded memory, use of a memory manager (such as HIMEM.SYS or EMM386.EXE), a 3.5 inch or 5.25 inch floppy drive and a hard drive with sufficient free memory to store the programs and data.

A preferred embodiment of the present invention, including the Software Program "GALAXY INMARSAT-C/GPS 4.0" User-Interface software, operates on a PC of the above description, connected to a DCE 24 such as the GPS/communication digital radio system "TNL 7001 Maritime Inmarsat-C" from Trimble Navigation Ltd. Sunnyvale, Calif.

The FIM 46 interprets the .FRM data file 42 input, controls the appearance of the UED form and display 60 presented on monitor 32 and controls the input of selected form data elements to be reformatted and transmitted as described below. In a preferred embodiment of the invention the FIM 46 is the program "C-WORTHY", from Novell, Ogden, Utah.

PREPARATION OF SCRIPT FILES

To prepare for operation of the invention, the .FRM file(s) 42 and .ODL file(s) 44 must first be prepared. The process of preparing the .FRM file 42 is performed by a programmer or system administrator in a development environment using the FBT form development program 49 of the C-Worthy program as is well known in the art. The preparation of the .ODL file may take place off line using any of a number of ASCII editors by means familiar to those skilled in the art and is discussed below.

The files 42 and 44 may typically be prepared at a remote site by a system administrator and shipped to the MES 20 by means of a floppy disk, or may be down-loaded to the system memory by means of the DCE communication link 34 as is well known in the art.

The .FRM file 42 and associated .ODL file 44 may be loaded into the CPU 38 by the DOS operating system in preparation for use. The files 42 and 44 must be named with the same prefix name, for example "truck.FRM" and "truck.ODL", followed by the respective suffixes, as indicated.

The .FRM form data files 42 which are output by the "C-Worthy" FBT are binary coded data structures which are interpretable by the FIM module 46. Other embodiments of form data files 42 are contemplated in which the code could be a human readable code, such as ASCII. However, in the embodiment described here, the .FRM files 42 are binary.

The .ODL files 44 of the embodiment described here are in ASCII code. Other embodiments of this invention could use a different coding scheme, for example, binary. Using a binary code as the input to the interpretive ODL module 48 would require that another tool be developed to generate a binary coded version of a .ODL file for input to a different version of the ODL module 48.

FORM DISPLAY

With reference to FIG. 2 there is shown an example of the screen form 60 displayed on display 32. Form generation and display programs are well known in the art. A brief discussion follows of a representative Form generation and display program used in combination with a preferred embodiment of the present invention. The display form 60 is the visual output representation of the form data resulting from the C-Worthy program FIM module 46 interpretation of the previously prepared .FRM file 42. The structure of the form 60 to be presented to the user is designed by the system administrator by means of the C-Worthy FBT 49. The FBT generates a binary form data file (the .FRM file 42) containing information on how to display and interact with the form display.

The Form Fields shown on display 60 are generated by the FIM 46 by interpreting the .FRM file. The Form Fields include Form Field label variables and Form Field Value variables. Field Label variables 62 a–h and Field Value variables 64a–h are positioned on the screen 60 by associated x,y screen location values. The x, y location values and the appearance of the form data elements shown on the screen 60 are controlled by the output of the FIM 46. The x, y location values and other attributes of the form data elements such as font, size, color and the like, comprise the form data elements of the Form Fields 62a–h and 64a–h and are stored in a data base of C-Worthy data structures indicated by numeral 66 in FIG. 1. A full description of the C-Worthy data structures are documented in "cwArchitect, User Guide and Tutorial", 1989 Custom Design Systems, Inc. and will not be repeated here. See "cwArchitect", op. cit., Appendix A, Structures, pages 367 through 424, incorporated herein by reference.

With respect to FIG. 1 and FIG. 2, the Form Field value variables 64a–h may have values entered in three ways. Constants may be programmed by the system administrator as fixed data fields during the preparation of the .FRM file. Values may be entered by the MES operator during the editing of the screen 60. Alternatively values may be obtained from system variables 50 which are entered by the .FRM file 42 data structure references to the Form Field Keywords of Table I and interpreted by the C-Worthy module 46.

In an embodiment using the C-Worthy form builder, the reserved Form Field Keywords (FFK), shown in Table I, may be used to precharge selected data fields, for example, 64c,d,e,f with values of selected system variables. It is one advantage of this invention, that the form builder tool 49 and FIM 46 may be used for displaying the value of selected system variables during display time through the reference to FFK's in the .frm file 42.

The reserved Form Field Keywords are discussed in Appendix A, section 3. Form Field Keywords are used when creating a form using the C-Worthy Form Builder. These keywords follow legal C-Language variable name conventions as required by the C-Worthy Form builder when naming a form field. These keywords trigger the FIM 46 to pre-charge these form fields with system parameter values at the time when the form is to be displayed to the user. The variable names of Table I are reserved for this purpose. To take advantage of this feature, the system administrator/ programmer must name the form fields in the C-Worthy Form builder with the Form Field Keyword names as shown in the example of Appendix A, Section I.

The values of fields displayed in the fields 64*a* and 64*b* are entered by the user at run time. The presentation and format of the values displayed on screen 60 are determined by the data structures contained in the specific .FRM file 42.

TABLE 1

| name | description | type |
|---|---|---|
| _LAT | current latitude | string |
| _LON | current longitude | string |
| _COG | current course-over-ground (degrees) | integer |
| _SOG | current speed-over-ground | integer |
| _TIME | current local time | time |
| _DATE | current date | date |
| _MOBILE_NUMBER | mobile ID number | string |
| _UTC_TIME | current UTC time | time |
| _TOF | (not supported yet) | |
| _DOF | (not supported yet) | |
| _SERIAL_NO. | (not supported yet) | |

The form data and display information is represented by data structures described in the C-Worthy documentation, "cwArchitect, User Guide and Tutorial", op cit.

FIM 46 stores the characteristics of the display fields in a form data base (DDB) 66. The DDB 66 contains much information that is relevant to the specific form tool, such as x,y screen location, font type, size, color, field value or string data, read/write permission, hide/display, and the like. Many of these characteristics are specific to the particular form builder tool used, and do not have any application to the subsequent message format and transmission process.

INTERMEDIATE DATA EXTRACTION

With respect to FIG. 1 and FIG. 2, as mentioned above, the form data elements of the Form Fields of screen 60 such as "TRIP STATUS" 62, "In Progress" 64 and the like are stored in the C-Worthy data structures of the form data base 66. In the interest of good programming practice, it is preferred to enable the message generation and formatting process of this invention to be rendered as independent of the specific form builder tool and form file interpreting program as possible. Therefore, in a preferred embodiment of this invention, an intermediate data extraction step is performed to extract the data fields of interest from the form data and store them in an extracted data base 68.

With reference to Table II and Table III there is shown a C-language definition of the relevant self-describing data structures used by a preferred implementation of the ODL module 48 of this invention. This is a representation familiar to a person skilled in the art of C-programming. Table II indicates four types of identifiers beginning with the prefix "DDL_". The DDL_ prefix is a convention designed to provide unique identifier names relevant to the current module of C-code. The four identifiers, DDL_MSG_INFO, DDL_FORM_FIELD, DDL_FORM_TITLE, AND DDL_TEXT provide the ODL module 48 with enumerated values to identify the corresponding data structures of the extracted data base 68.

The complete data content of a form is represented by multiple instances of data structures defined in line 22 through 26 of Table II and line 5 through 33 of Table III. Each instance of these structures describe a particular element of the form ranging from individual field descriptions to the title shown at the top of the form. Each instance of the "Ddl_FormDataDesc" structure has a member called "next" that points to the next "Ddl_FormDataDesc" structure, describing the next data element in the form.

With reference to Table III, one example of a data element that is used in the form is called a field (enumerated as DDL_FORM_FIELD) data structure. Fields are locations in the form where an operator can enter data. The field has various parameters associated with it such as the physical size, a label or prompt, a data type and of course the data itself as entered by the operator. Table III lines 5 through 26 describes the data structure that defines a field.

The intermediate data extraction module 47 extracts a subset of the relevant form data elements from the C-worthy data structures of data base 66 and composes a linked list of type Ddl_FormDataDesc as shown in Table I. The form data elements from the C-Worthy data structures are stored in a data base 68 containing data elements of linked list data structures as shown in Table III. This linked list has as many list elements as there are Form Fields encountered on the form.

Each Form Field on a screen form is assigned an ordinal number or fieldNumber. The fieldNumber element of Ddl_FormField shown in line 7 of Table III contains a field index integer which is the ordinal number of the field as defined by the .FRM file for a particular Form Field. The fieldNumber is later used by the ODL program module to identify the Form Field to be processed. The organization of the linked list data structures is independent of the Form FieldNumber. Later on in the code, a search is performed to find the correct form data field element in the list based on the "fieldNumber".

TABLE II

```
1   /*
2   ** Form data type enum list. This enum list identifies the type of
3   ** data contained in "FormDataDesc". All identifiers use "DDL_" as
4   ** prefix.
5   */
6   typedef   enum {
7       DDL_MSG_INFO       /* form message info (address, etc) */
8       DDL_FORM_FIELD,    /* Form Field as extracted from form */
9       DDL_FORM_TITLE,    /* form title as extracted from form */
10      DDL_TEXT,          /* free format text to be added to message */
11      /*more to come . . . */
12      DDL_MAX            /* terminator */
13  } Ddl_FormDataType;
14  /*
15  ** Data list element. Each data object is contained in a element of
16  ** this type.
17
18  ** "data" points to a structure of data object types defined below.
19  ** The "type" element is an integer identifying the type of data
20  ** "data" is pointing to.
21  */
22  typedef   struct   Ddl_FormDataDesc {
23      struct   Ddl_FormDataDesc *next;
24      Ddl_FormDataType     type;
25      void              *data;
26  } Ddl_FormDataDesc;
```

TABLE III

```
1   /*
2   ** Describes a Form Field; DDL_FORM_FIELD
3   ** This element describes the data field from form
4   */
5   typedef   struct Ddl_FormField   {
6           FM_DATA_TYPE   fieldType;      /* data type of field */
7           char           fieldNumber;    /* ordinal number of the field */
8           char           x;              /* sub field number in x direction */
9           char           y;              /* sub field number in y direction */
10          void           *data;          /* pointer to data - is of type "fieldType"
11                                         * This data type is driven by the form package.
12                                         * It can be anything from simple integer types
13                                         * to linked lists when the field type is a list.
14                                         */
15          size_t         size;           /* size of data object in bytes */
16          void           *misc1;         */ pointer to miscellaneous data used in */
17          void           *misc2;         */ exception cases*/
15          char           data_x;         /* x position in character count ( column ) */
19          char           data_y;         /* y position in character count ( row ) */
20
21          char           *prompt;        /* field prompt text - zero byte terminated */
22          char           prompt_x;       /* x position in character count ( column ) */
23          char           prompt_y ;      /* y position in character count ( row ) */
24          char           height;         /* height of data field in char count */
25          char           width;          /* width of data field in char count */
26  } Ddl_FormField;
27  /*
28  ** Describes the form title of a form
29  */
30  typedef   struct Ddl_FormTitle {
31          #define   DDL_MAX_FORM_TITLE   80
32          char   formTitle[DDL_MAX_FORM_TITLE+1];
33  } Ddl_FormTitle;
```

Given a structure pointer of type Ddl_FormField, "ff", in the example of the screen 60 illustrated in FIG. 2, "TRIP STATUS", in which "ff" is the instance of the pointer of that type, would be stored in the ff->prompt element 62, and "In Progress" would be stored in ff->data element 64, along with their x, y coordinates in character units in the corresponding data_x/y and prompt_x/y elements and other relevant information as defined in the structure definition above.

A portion of the ODL module 48 is dedicated to the extraction of a sub set of data elements 70 from the display data base 66. In the event it is desired, in the future, to use a different form builder tool 49, the change of the code of the current embodiment of the invention would be restricted to the intermediate data extraction module 47, thereby saving time and cost.

Figure 3:
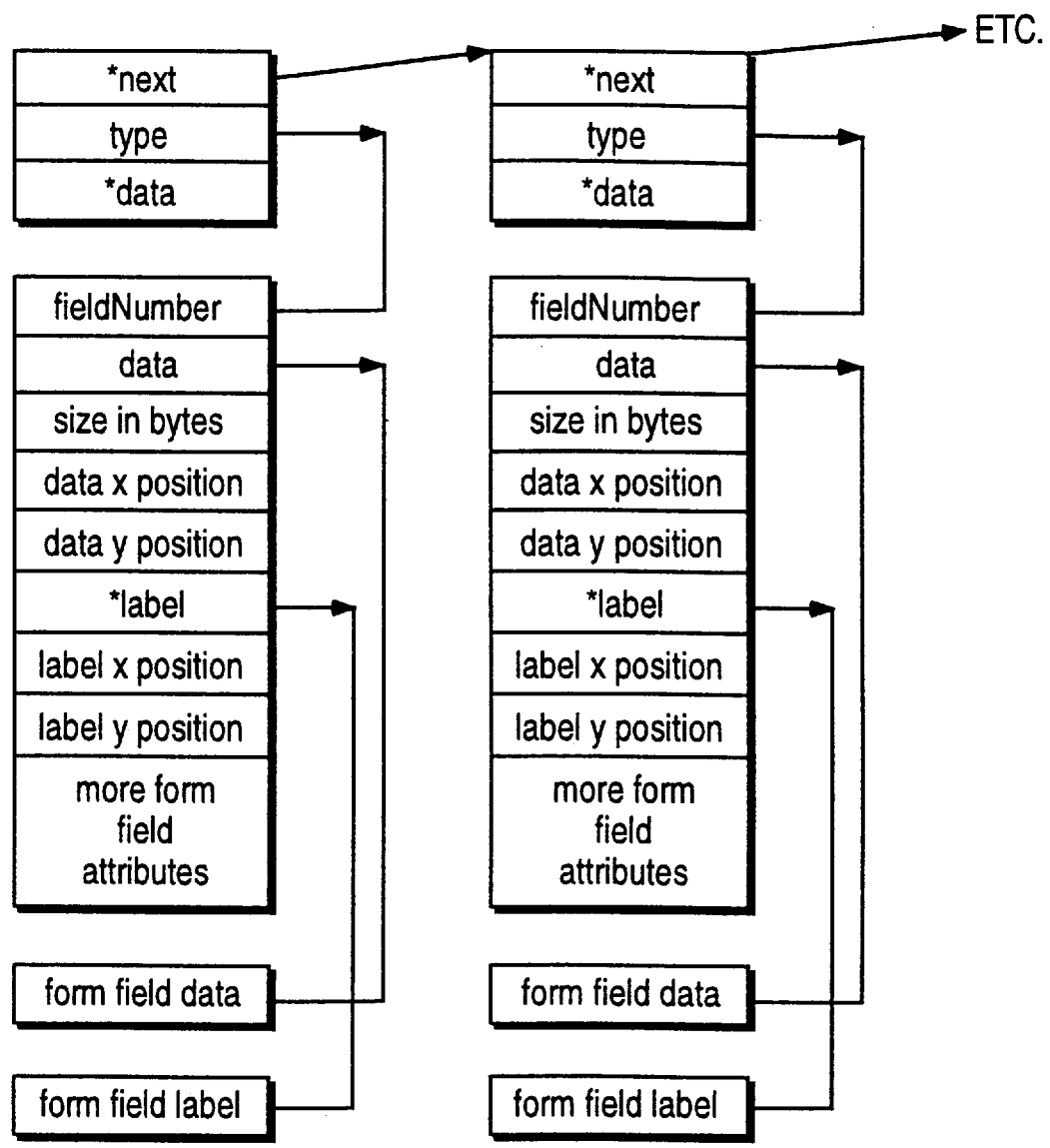
FIG. 3 is a schematic diagram of a portion of the data structure of data elements stored in the extracted data base of system memory of the. System of FIG. 1.

The extracted data elements are stored in the extracted data base 68 and output message data elements are stored in the .FDO output message file. With reference to FIG. 3, there is shown a pictorial representation of data elements stored as a linked list in the extracted data base 68.

In the current implementation of the preferred embodiment the administrator can reference the Form Fields only by ordinal number in the .ODL file 44, not by field name. It is contemplated that future versions may implement a feature where the reference may be made by field name.

ODL SCRIPT FILES

Referring again to FIG. 1, in a preferred embodiment of the invention, the .ODL script files 44 are written using an Output Description Language described below. A .ODL file may be generated by the user or system administrator with a standard ASCII editor 41 and must be saved into a file using the following naming convention.

If a .FRM file, or Form file describing form data exists, the corresponding ODL file 44 must have the same base name as the .FRM form data file 42, except the suffix must be .ODL. All .FRM files 42 and .ODL files 44 must reside in a transmit form directory.

Example:

form file ODL file MYFORM.FRM MYFORM.ODL

The ODL language resembles C-language constructs to a certain extent. Appendix A contains the ODL programming reference manual for the exemplary MES 37 shown in FIG. 1. The "GALAXY 7000" message preparation and transmission system is available from Trimble Navigation Co. of Sunnyvale, Calif. Appendix A describes the structure of the ODL language constructs in specific detail.

In this implementation the entire .ODL file must be enclosed with the $ODL{. . . } construct.

The $ODL{} construct of the .ODL file 44 must consist of at least a COMMAND section, or a MESSAGE section, or a DATA_REPORT section, as described in Appendix A below. The DATA_REPORT section can coexist with the COMMAND section and the MESSAGE program section and must all reside within the $ODL{.. .} construct.

The programming constructs of the preferred embodiment of the Message Processing Program of the present invention include ODL Program Section Keywords, Program Statements, System Variable Names, ODL User Variables, and Form Field Keywords.

PROGRAM SECTION KEYWORDS:

$ODL{<ODL program>}: ODL programs must be enclosed in the $ODL{} construct

COMMAND : Indicates the start of the command section which executes ODL commands; and selects global ODL setups.

MESSAGE: Starts a MESSAGE section where the exact format of the outgoing message is created from the form input data. The MESSAGE section accepts format programming constructs, like if(), while(), assignment and expression statements documented in the Appendix.

DATA_REPORT: Starts a data report section where a custom data report message is prepared by the system administrator. In the INMARSAT-C environment the message must be defined in the INMARSAT standard. The 'A' register referenced in the INMARSAT documentation, op cit, is assumed to be set at the time the ODL program 48 runs. It is contemplated that future implementations will contain additional data reporting features A complete description of Program Section Key words is included in section 1.1 of Appendix A.

ODL PROGRAM STATEMENTS

With reference to FIG. 1 and FIG. 2, ODL program statements are described below. An OUTPUT() statement formats and outputs data to be transmitted. The data formatting syntax resembles C-Language printf() format specifiers.

A FORM_FORMAT statement selects between output formats designed for specific destination configurations. Destination formats might include a) another Inmarsat-C MES with compatible form software capable of reproducing the form; b) a character by character screen dump in ASCII compatible with virtually any ASCII printer or display.

A DELIMITER statement assigns a character string to be the delimiter between output() statements.

A DEBUG ON statement turns the ODL program debug on.

A MSG XMIT statement initiates the message transmission.

An ADDRESS statement specifies the destination address.

A complete description of program statements is included in section 1.2 of Appendix A.

FORM FIELD VARIABLES $FIELD[<field Index>]VARIABLES

This variable holds the data or value contained in a Form Field. The data is accessed via an index, <field Index> which is the integer ranging from 0 to N where N is the ordinal number of the last field on the form. The system administrator determines which index number corresponds to which Form Field when the form is built by the FBT 49.

$FLAB[<field Index>]VARIABLES

This variable holds the form label belonging to a Form Field. The data is accessed via the index <filed Index> which is an integer from 0 to N.

SYSTEM VARIABLES

System variables are pre-defined keywords that allow the ODL programmer to gain access to internal system information or form specific data. Representative examples of system variables are described below. A complete list of current system variables for the "GALAXY 7000" System are describe in section 1.4 of Appendix A.

$MOBILE_NUM

This variable contains the current DCE 34 Mobile Number identifier string or phone number.

$COG SOG

This variable contains current Course Over Ground and Speed Over Ground data provided by the position locating device 37.

$COG

This variable contains current Course Over Ground data.

$SOG

This variable contains current Speed Over Ground data.

$POSITION

This variable contains current Position data.

ODL USER VARIABLES

User variables are restricted to the MESSAGE{} program section. These variables can be used the same way variables would be used in many programming languages. User variables are prefixed with the "#" character. Other than that, the same naming conventions for variable names in the C-programming language apply. A complete description of User Variables in included in section 1.3 of Appendix A.

LANGUAGE CONSTRUCTS

ODL language constructs resemble the C-programming language in some areas. The table listed in section 2 of Appendix A documents these constructs in detail. All language constructs documented can only be used in the MESSAGE{} program section.

Form Field KEYWORDS

Form Field Keywords are used when creating a form using the form builder tool 49. The Form Field Keywords follow legal C-language variable name conventions as required by the form module 46 when naming a Form Field. These Keywords in the .FRM files 42 trigger the form module 46 to pre-charge the selected Form Fields with the respective system parameter variable values 50 at the time the form 60 is to be displayed to the user.

A set of variable names are reserved for this purpose. Section 3 of Appendix A lists reserved names for the Form Field Keywords of a preferred embodiment of the Message Processing Program of the present invention.

With reference to FIG. 1 and FIG. 4, there is shown an example of the use of Form Field Keywords. A form screen 180 is built by the system administrator or programmer using the form builder tool 49 as previously described. For a Form Field 182 and Form Field label 184 in which it is desired to display a selected one of the system variables 50, the system administrator or programmer enters a respective Form Field Keyword 186, for example _DATE. At run time, the form module 46 will precharge the display Form Field 182 with the value of the system variable _DATE. To take advantage of this feature, the system administrator or user must name the respective Form Fields of the form 180 with the respective Form Field Keywords of the reserved names of section 3 of Appendix A.

FORM DATA EXTRACTION

Figure 4A:
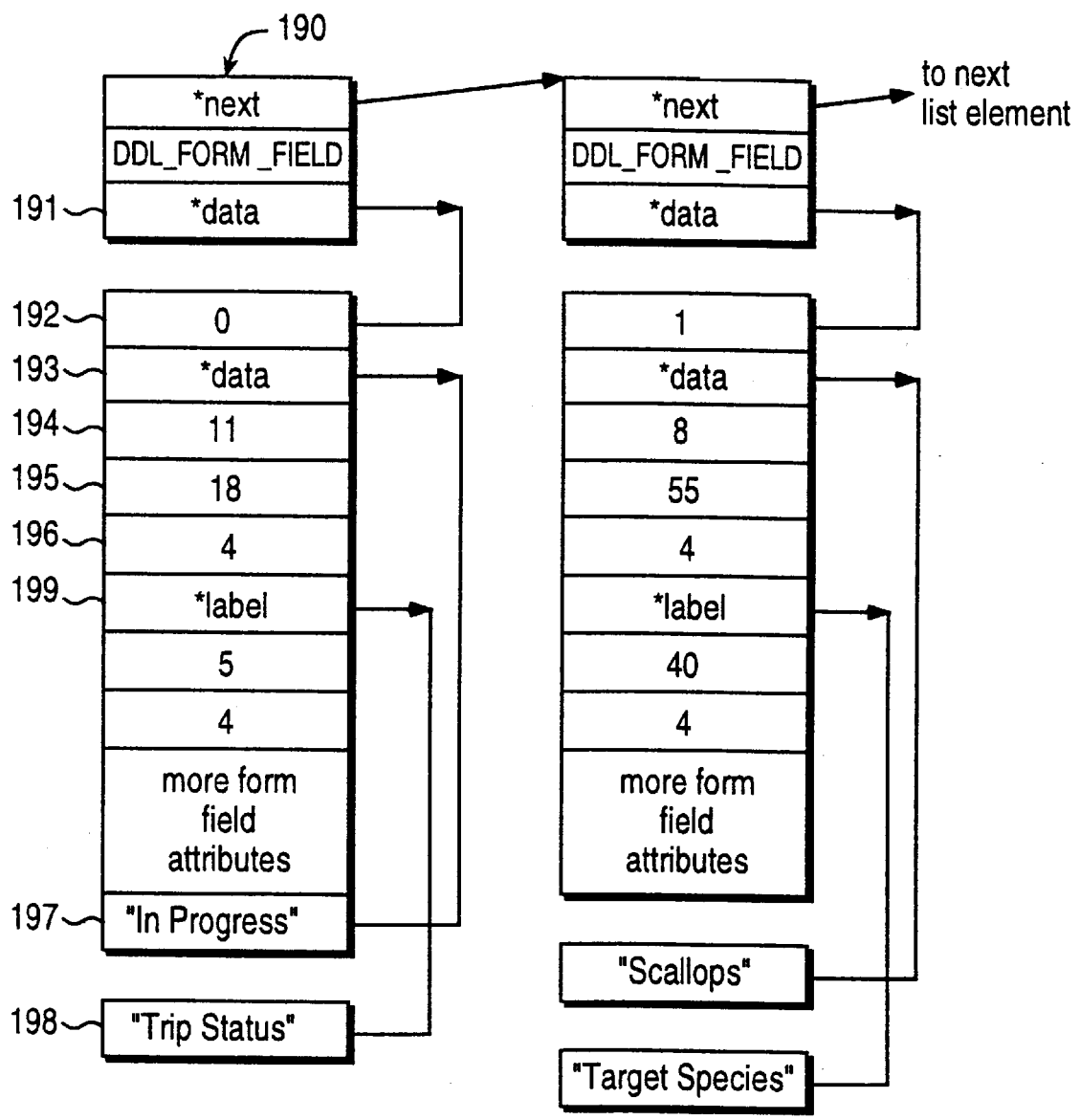
FIG. 4A is a pictorial representation of a portion of the intermediate data structure of the display screen of FIG. 4.

With reference to FIG. 4A, there is shown a pictorial representation of a portion of the data structure of extracted data base 68 for the form screen example 180. The "*data" pointer 191 of the list element 190 points to the data portion of the linked list 190, starting with the data element 192. The data element 192 contains the value "0" which references the first Form Field of screen 180. The data element 192 is the fieldNumber of the form field 62 a for the form 180. The next data element 193 contains the pointer *data, which points to the data element 197, which is the string "In Progress" and which will appear in the Form Field 64b.

The next data element 194 contains the value "11" which is the size of the data element 197 in bytes. The next data element 195 contains the value 18 which is the x position of the element 197 in character count, or column, on the screen. The following data element 196 contains the value 4 which is the y position of the element 197 in character count, or row, on the screen 180.

The "*label" pointer 199 of list element 190 points to the data element 198 containing the string "Trip Status" which is displayed as 64a on the screen 180.

In a similar fashion, the relevant data elements of Form Fields are stored for later access by the ODL module 48.

The constructs used will be familiar to those skilled in C programming. It is contemplated that other embodiments of the invention could be implemented using alternative language constructs and/or programming languages, such as BASIC, FORTRAN, PASCAL, and the like.

OPERATION OF THE INVENTION

In the description following, reference will be made to the Program Section Keywords, Program Statements, System Variable Names, ODL User Variables, and Form Field Keywords described in Appendix A.

Figure 5:
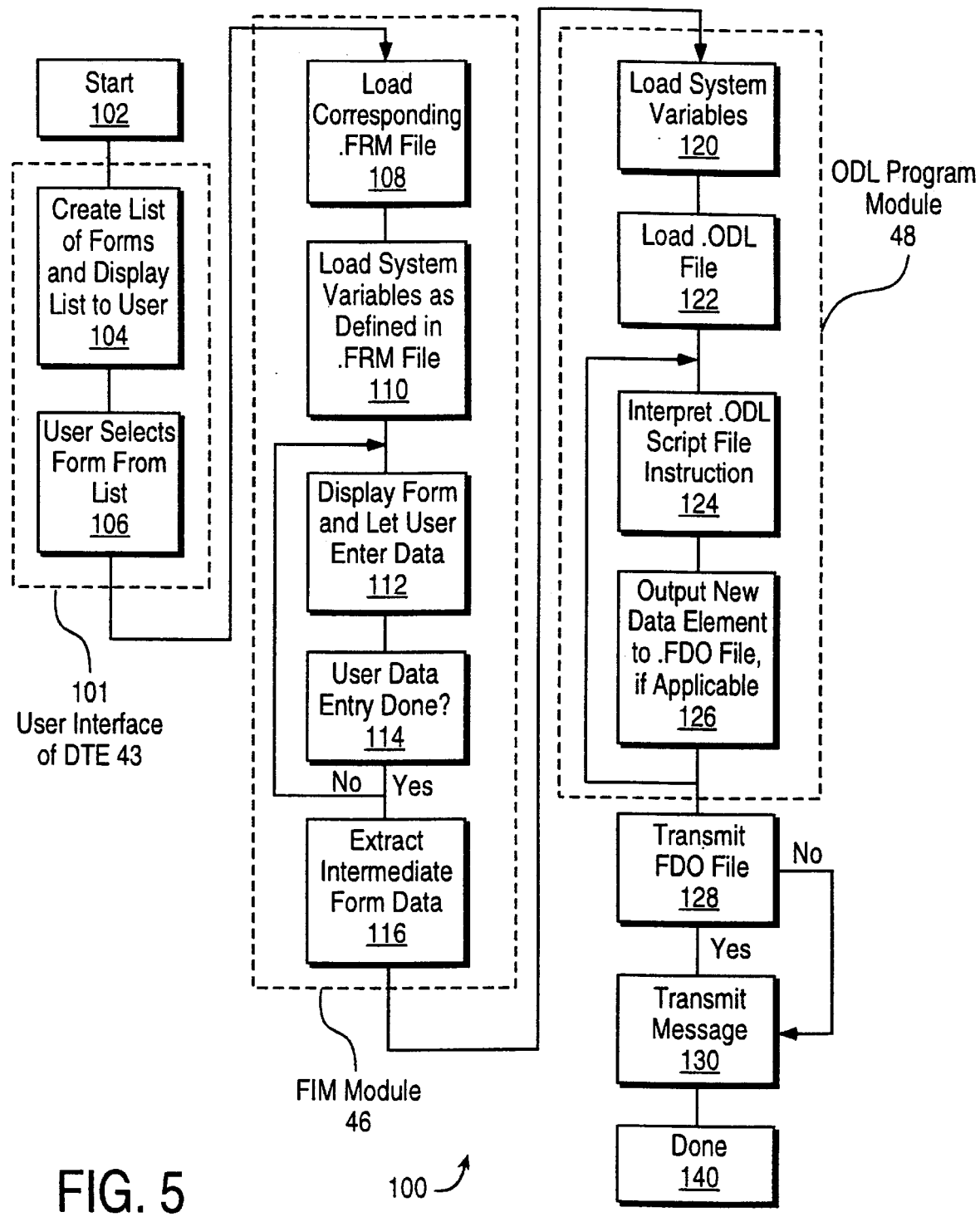
FIG. 5 is a flow chart of displaying, editing, formatting and transmitting a message derived from a Form Screen in accordance with one embodiment of this invention.

With reference to FIG. 5, there is shown a flow chart, generally indicated by the numeral 100, of the operation of the MES system 20 using the Message Formatting software module 48 and 47 of this invention operating in combination with the form display module FIM 46 as described above. Reference is also made to blocks in the block diagram of FIG. 1.

The user enters the form processing mode at block 102. In a preferred implementation of an MES system 20, for example, the user begins by selecting the a "Form" hot key from a menu (not shown) displayed on the screen 32 by a form processing user interface code module (not shown) of the DTE program 43. The DTE 43 user interface creates a list of currently available forms and displays them to the user at block 104 by searching for .FRM files in a "xmitfrm" directory of the MES application home directory or another path if the user redefined it via other user interface 43 features.

Then, by examining each .FRM file in the list of .FRM files, the form title is extracted from each .FRM file and displayed at block 104 in a visible display list to the user. The DTE 43 user interface lets the user select from this list at block 106 which form to process. Once the user makes a choice, the FIM module 46 is entered at block 108. At the block 108 the corresponding .FRM file 42 is loaded into memory by the FIM module 46.

Control then passes to block 110 and all Form Fields are pre-charged with their default values as defined in the .FRM file 42. At block 110 the FIM module 46 examines the Form Field names 78 (Not the Form Field label names 76 displayed to the user later) and tries to find a match with Form Field key words (FFK). If a match is found, the default value 80 of the corresponding Form Field 78 is replaced with the corresponding system variable. For example: If the system administrator named a Form Field "_DATE" via the FBT, the default value for that Form Field would be replaced with the current date rather then maintaining the default date entered by the system administrator at the time the form was built via the FBT.

After loading all system variables for the particular form, the FIM 46 enters the form display/edit state at block 112. In this state, the form and its data is displayed to the user according to the .FRM data file and system variables previously loaded into system memory. In addition, the FIM 46 expects keyboard input from the user to manipulate the form. As the user enters data or uses field selection keys to move between Form Fields, the FIM 46 updates the display accordingly to give visual feedback about the progress of the form editing process.

Form data entry and editing continues in the loop from the block 112 and the block 114 until the user is satisfied with the data entry and wishes to send a message. With reference to FIG. 2 there is illustrated a label shown as "step 4)" for indicating how to complete data entry and editing. The operator presses the ESC key and a "soft key" on the user entry keyboard 36 previously defined by the FIM control program as the SEND key (not shown), to initiate the transmission of the message.

Once the user exits the form editing state by pressing the key sequence directed by the label field "step 4)" on FIG. 2, corresponding to block 114 of FIG. 5, the FIM module 46 relinquishes control to the intermediate data extraction module at the block 116. The block 116 extracts relevant form data elements as needed later during the ODL program processing stage.

The form data elements are read (in the preferred implementation) from the C-Worthy form data structures in data base 66 and stored in a linked list in data base 68 as described above. This linked list data base 68 is kept in PC 38 system memory for later use in the ODL program processing stage.

Control then passes to the ODL module 48 at block 120. The first step in this processing stage is to load all possible system variables since it is not known until reading the ODL source program which system variables are actually needed. The next step is to open the associated .ODL Program source file for reading at block 122 The source file name is known since the .ODL file base name corresponds to the previously selected .FRM form file.

Control is passed to the .ODL Parser at block 124 which interprets every source line as it is encountered. The .ODL parser interprets each source line in the .ODL source file and takes appropriate actions as legal ODL constructs are recognized by calling a Semantic Evaluator. The parser and semantic evaluator are described further below. As ODL outputs statements are encountered, new output message data elements are formatted and appended to the. FDO file at block 126 for later transmission.

Control continues to loop back from block 126 to block 124 to interpret the next statement until all statements are interpreted. Once the end of the .ODL source file is encountered, a test at block 128 is performed to check if message transmission was selected. This selection is part of the ODL language, too. The action however is postponed until all of the ODL code has been processed.

If message transmission had been selected, control is passed to block 130 which initiates transmission of the .FDO file. Once the program reaches the "Done" block 140, control is passed back to the user interface 101 of the DTE program 43 to await new user requests.

Figure 6:
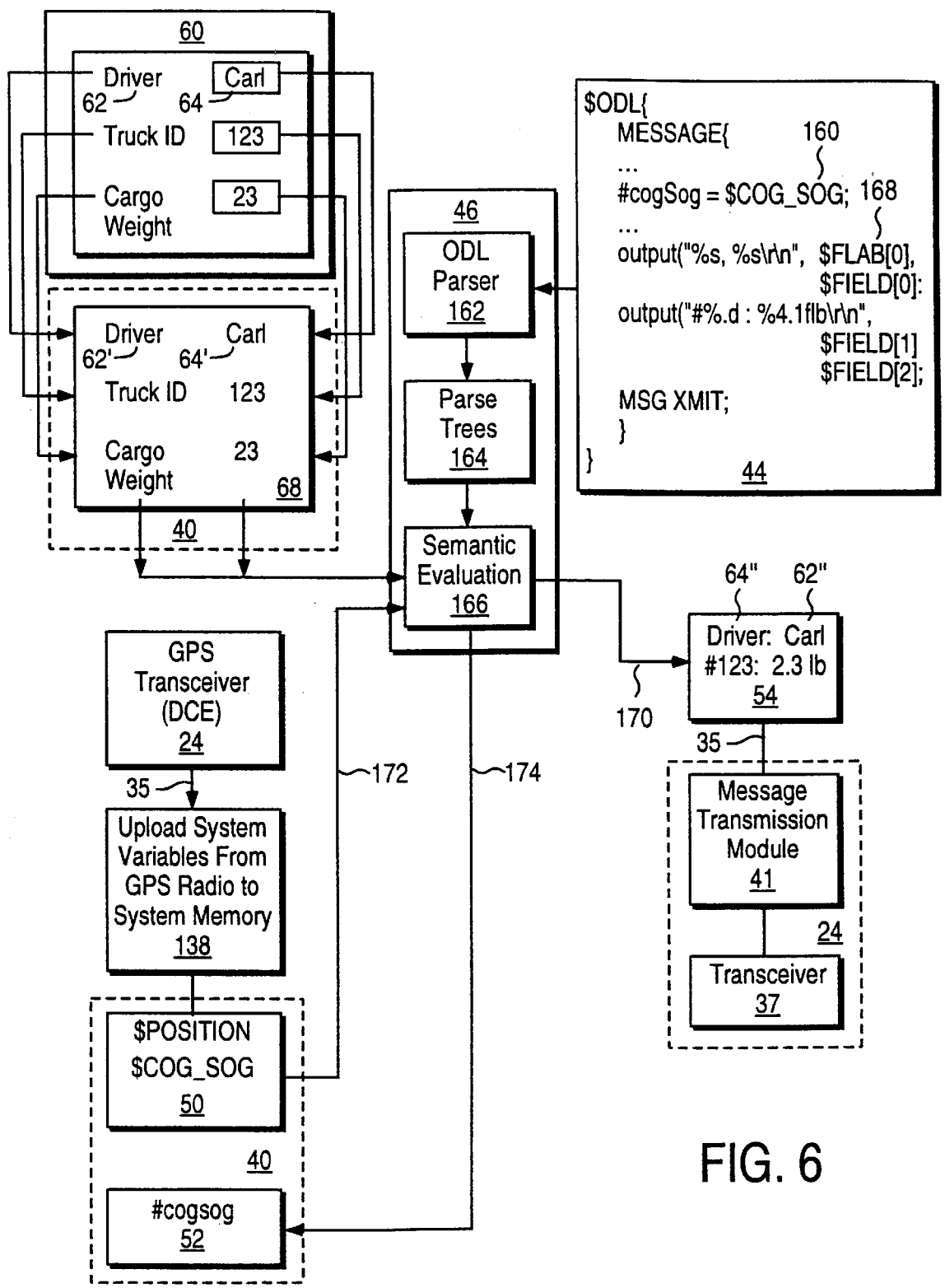
FIG. 6 is a flow chart of the interpretation, parsing and semantic evaluation of instructions from the .ODL file by the ODL program and the resulting format of output message data in accordance with one embodiment of this invention.

With reference to FIG. 6, there is shown a diagram of an example of instruction interpretation by the ODL program 48.

The first example is the interpretation of an assignment statement 160 in the .ODL file 42 (reference Appendix A. section 2) assigning the value of a system variable 50 to a user variable 52.

The assignment statement instruction 160 from the .ODL file 44 is parsed by an ODL parser 162. The ODL parser 162 includes LEX and YACC based program modules, which at run time, produce parse trees 164 familiar to those skilled in the art. The present implementation uses the MKS LEX and YACC parser generation tools by Mortice Kern Systems, Inc. 35 King Street North, Waterloo, Ontario, Canada. As the ODL parser 162 recognizes legal ODL constructs, it calls a Semantic Evaluation Module 166. The output of a parser is usually a parse tree which is then interpreted by a semantic evaluation process as shown in FIG. 6.

Semantic Evaluation modules are also familiar to those skilled in the art. The Semantic Evaluation module evaluates the parse trees generated by the parser and takes the appropriate actions, like assigning a variable, retrieving a system variable, and the like. In the particular case shown, the Semantic Evaluation Module 166 retrieves the value of the system variable $COG_SOG from the system memory.

The system variable $COG_SOG had previously been stored in the system memory by the update from the block 138, through the serial link 35 to the DCE 37. The Semantic Evaluation Module 166 assigns the value of the $COG_SOG system variable 50 to the #cogsog user variable 52 in system memory. The user variable #cogsog is now available to be modified as desired by the system administrator's programming instructions stored in the .ODL file 44 and executed by the ODL module 48.

A second example of instruction interpretation begins with the output() statement 168. The output statement 168 contains standard C-language print() formatting constructs for formatting the data fields referenced by the instruction. The statement 168 also references the Form Field values by the system variable names and the <field index> integer. The Form Field label 62 is associated with the ODL form label variable $FLAB[0], since it was the first (counting from zero) Form Field on the form 60. The value of the data field 64 associated with Form Field label 62 is stored in the extracted data base 68, from which it is accessed by the SE block 166. The output statement 168 formats the data according to the format string of the output() instruction (first argument in output ()), and outputs it to the .FDO file 54. The instruction 168 next obtains the value of the field 64 since it is associated through the ODL Form Field variable $FIELD[0]. The value of field 64 is obtained from the extracted data base 68 as before, formatted by the format string of the output instruction 168 and output to the FDO file 54.

Further output() statements are similarly processed until the .ODL file 44 has been completely evaluated and all message data elements formatted and stored in the .FDO message output file 54.

Evaluation of the MSG XMIT statement in the .ODL file, initiates message transmission as described in the flow chart of FIG. 5. The formatted message in the .FDO file 54 is accessed by the serial data link 35 and incorporated into a transmitted message by the transmission module 41 and transmitted by the transceiver 37 of the DCE 24.

With reference to FIGS. 7, 8 and 9, there is shown a detailed example of the relationship between a screen form, a .ODL file based on the data in the from and an output message. generated by the ODL program. An example screen Form is indicated by the numeral 200 in FIG. 7. A .ODL file listing for generating a message based on the data fields of the Form 200 is indicated by the numeral 240 in FIG. 8. An output message (.FDO file) generated by the ODL program 240 is indicated by the numeral 260 and listed in FIG. 9. The screen form 200 is created by the "C-Worthy" FBT as herein before described.

The Form 200 contains data fields which are to be filled in by an operator or filled in by system sensor variables as previously described. In the example shown, the Trip Status data field 202 has been filled in by the operator with the string value of "Start". The Target Species data field 212 has been filled in by the operator with the string value of "Scallops".

Referring again to FIGS. 1, 8 and 9, this invention provides the system administrator or programmer a powerful tool for including appropriate system variable values 50 for loading into the corresponding Form data fields on display 32.

Specifically, the Form data fields have been assigned system variable values as shown in the Table IV below:

TABLE IV

| Form Field No. | Contents of Form Field label variable $FLAB[x] | FIG. 7 reference no. | Contents of Form Field value variable $FIELD[x] | Operator entered value |
|---|---|---|---|---|
| 0 | Trip Status | 202 | | Start |
| 1 | Date: | 204 | 07/26/94 | |
| 2 | Time: | 206 | 10:00 | |
| 3 | Wind Direction (deg) | 208 | 10 | |
| 4 | Wind Speed (knots) | 210 | 12 | |
| 5 | Target Species | 212 | | Scallops |
| 6 | Barometric Pressure | 214 | 3000 | |
| 7 | Air Temp (F.) | 216 | 62.0 | |
| 8 | Sea Surface Temp (F.) | 218 | 48.0 | |

The system administrator or programmer generates a .ODL file 240 following the description of the ODL Programming Reference Manual, App. A. The file 240 may be prepared with a standard ASCII text editor. The file 240 is designed to provide instructions which will be interpreted by the ODL module 48 to produce the desired format of the output message 260.

Some of the power provided by the ODL module can be seen in line 6 and 7 of FIG. 8. Reference is made to a secret header which are characters that are not necessarily known to the field operator who enters other data, but which have special meaning for the receiving central station computer. Line 7 of the ODL module causes the ODL module 48 to create a character string "#&*". The character string "#&*" is output as part of the transmitted message 260 as shown as the first three characters in line 1 of FIG. 9.

Another feature of the ODL module 48 is indicated by line 8 of the file 240 shows the value of the Form screen data field variable $FIELD[5] assigned to the ODL file 240 user string array variable #formstrg. At line 9 and 10 of FIG. 8, there is an IF statement in which the first element of the user string array variable #formstrg (#formstrg[0]) is tested against the corresponding element of the previously assigned user variable #reference. As can be seen in line 5 of FIG. 8, #reference has previously been assigned the string value "SOSEI". Since the string value of $FIELD[5], is "Scallops", the first element of $FIELD[5] is "S" and is the same as the first element of #reference, and the IF statement is true. The output statement in line 10 of FIG. 8 then results is the output of the "S" character into the message string 260. This can be seen in line 2 character position 1 of FIG. 9.

On the other hand, the IF statement in line 12 of FIG. 8 tests false, as the first element of the user string array variable #formstrg (#formstrg[0[) is not equal to the second element of the array variable #reference (#reference[1]). Therefore, the output statement in line 13 of FIG. 9 will not result in the output of an "O" character into the message 260.

With reference to the above table, FIG. 7, 8 and 9 it is apparent that the formatted message characters 4–12 of line 2, FIG. 9, correspond to the date in field 204 of FIG. 7, concatenated with the time in field 206 of FIG. 7. The characters 13–15 of line 2, FIG. 9, correspond to the wind direction in field 208 of FIG. 7, with a leading 0 as formatted by the format instruction "%03d" of line 26 in FIG. 8.

By further inspection of the statements of the ODL file 240, the screen Form 200, and the formatted output message 260, it can be seen that the output message 260 will be constructed according to the instructions coded in the ODL file 240, the values of the data fields 202–218 which are entered in the Form 200 and stored in the MES 20 system memory as instructed by the FIM module 46 and .FRM file 42.

Different types of messages may be formatted using the flexible power of the ODL programming language of this invention. Messages may be transmitted in a format that are easily readable by another person. For example a report can be delivered to a telex, facsimile or mailbox and can be read by anyone. Reports can be generated using compressed binary format and can only be read by an application that understands the packing format. A compressed binary format can be used which provides a cheaper, faster means of data transmission. Data or text may be added that is not known to the operator for purposes of security. Standard text messages can be stamped with position and time and can be displayed on a receiving system with appropriate mapping software. This flexibility also provides the capability to easily format messages in ways that are currently unforeseen.

The close integration of the ODL message formatting module and the FIM module 46 data structures, coupled with the access to the values of system variables provided by MES sensors, connected to a suitable communication module provides a powerful system for easily controlling transmitted message formats. It is anticipated that various embodiments of the message formatting system of this invention will prove of considerable value to disperse communication networks of diverse kinds in the coming years.

While the foregoing detailed description has described a preferred embodiment of a Message Formatting Software Program and System, in accordance with the present invention, it is to be understood that the above description is illustrative only and not limiting of the disclosed invention. It will be appreciated that it would be possible to modify the structure and form of the ODL language, the type of data constructs used, the type of Form Builder software package, whether position locating equipment is attached, and if attached what type of locating equipment such as GPS, Loran, and the like, the type of computing platform, memory system and operating system used, the type of communications equipment used, such as radio, telephone, satellite link, cellular phone or the like, the methods of parsing and passing variables and memory allocation, methods of manufacture or to include or exclude various elements within the scope and spirit of this invention. It is contemplated that the output message characters could be passed directly to a communications module for direct transmission without passing through an intermediate file storage step. It is also contemplated that the Form Interpretive module (FIM) and Output Description Language (ODL) module could be combined into one module without an intermediate data format extraction and storage step. Thus the invention is to be limited only by the claims as set forth below.

What is claimed is:

1. A computer program product provided on a computer readable medium having a plurality of computer readable program instructions recorded thereon for controlling the entry and display of data elements on an MES system, and subsequently reformatting form data elements into message data elements to be transmitted, said computer program product comprising:

instruction means for sequentially interpreting and executing data structures from a form data file, for controlling the display of a plurality of form data elements;

instruction means for displaying the plurality of form data elements;

instruction means for storing the plurality of form data elements in a form data base;

instruction means for receiving user entered data (UED) for altering at least one of the respective form data elements;

instruction means for updating the respective altered form data elements in the form data base until the user data entry is complete;

instruction means for successively interpreting and executing a sequence of output description language (ODL) instructions from an output description language control file (.ODL file), the ODL instructions defining operations on at least one of the stored form data elements;

instruction means for creating a second sequence of reformatted message data elements responsive to the interpreted and executed .ODL instructions and the values of the form data elements;

instruction means for signaling a communication device to transmit the reformatted message data elements to a remote receiving site, whereby the second sequence of reformatted message data elements is transmitted in a desired format.

2. A computer program product as set forth in claim 1 wherein the product includes:

instruction means for extracting a plurality of the form data elements from the form data base and storing the plurality of form data elements in an extracted data base.

3. A computer program product as set forth in claim 2 wherein:

the operations of the .ODL instructions include: control constructs including if(expression) {<statement>;}, while(expression) {<statement>}, <user variable>= expression, computation, reformatting, sequencing, comparing, substitution, deletion, and insertion of additional values, strings and data elements.

4. A computer program product as set forth in claim 1 including:

instruction means for including additional system variables in the second sequence of reformatted data elements.

5. A computer program product as set forth in claim 1, including:

instruction means for storing the second predetermined sequence of reformatted data elements in a data output (.FDO) file, and instruction means for connecting the .FDO file to the communication device for transmission through the communication network.

* * * * *

UNITED STATES PATENT AND TRADEMARK OFFICE
CERTIFICATE OF CORRECTION

| | | |
|---|---|---|
| PATENT NO. | : | 5,852,825 |
| DATED | : | December 22, 1998 |
| INVENTOR(S) | : | Phillip D. Winslow |

It is certified that error appears in the above-identified patent and that said Letters Patent is hereby corrected as shown below:

In column 12 at line 29 insert --program-- between "Language" and "module"

Signed and Sealed this

Twenty-seventh Day of March, 2001

Attest:

NICHOLAS P. GODICI

Attesting Officer

Acting Director of the United States Patent and Trademark Office